US012690954B2

(12) United States Patent
Jeong et al.

(10) Patent No.: US 12,690,954 B2
(45) Date of Patent: Jul. 28, 2026

(54) METHOD FOR OBTAINING CROWN REGION SHAPE USING INTRAORAL SCANNER HAVING TOMOGRAPHIC IMAGING FUNCTION

(71) Applicant: Huvitz Co., Ltd., Anyang-si (KR)

(72) Inventors: Hyo Sang Jeong, Anyang-si (KR); Min Soo Cho, Anyang-si (KR); Weon Joon Lee, Anyang-si (KR)

(73) Assignee: Huvitz Co., Ltd., Anyang-si (KR)

( * ) Notice: Subject to any disclaimer, the term of this patent is extended or adjusted under 35 U.S.C. 154(b) by 122 days.

(21) Appl. No.: 18/619,821

(22) Filed: Mar. 28, 2024

(65) Prior Publication Data

US 2024/0325126 A1 Oct. 3, 2024

(30) Foreign Application Priority Data

Mar. 30, 2023 (KR) ........................ 10-2023-0042127

(51) Int. Cl.
*A61C 13/00* (2006.01)
*G06T 17/00* (2006.01)

(52) U.S. Cl.
CPC .......... *A61C 13/0004* (2013.01); *G06T 17/00* (2013.01); *G06T 2207/10072* (2013.01); *G06T 2207/30036* (2013.01)

(58) Field of Classification Search
CPC ................................................ A61C 13/0004
See application file for complete search history.

(56) References Cited

U.S. PATENT DOCUMENTS

2004/0220691 A1* 11/2004 Hofmeister ........ A61C 13/0004
700/98
2010/0281370 A1* 11/2010 Rohaly ................ A61C 9/0053
715/810

(Continued)

FOREIGN PATENT DOCUMENTS

EP          4014846 A1    6/2022
KR    10-2022-0085364 A    6/2022

(Continued)

OTHER PUBLICATIONS

European search report for counterpart European Application No. 24165224.7, dated Jul. 25, 2024.

(Continued)

*Primary Examiner* — Nicholas D Lucchesi
(74) *Attorney, Agent, or Firm* — United One Law Group LLC; Kongsik Kim; Jhongwoo Peck

(57) ABSTRACT

A method of obtaining crown region shape includes obtaining a three-dimensional surface shape image of an oral structure including a tooth on which tooth deletion has been performed; setting a surface edge of a tooth deletion region as a location of a region of interest; scanning a surface shape and an internal cross-section of the oral structure at a predetermined location of the oral structure, and obtaining a partial surface shape image and a partial internal cross-sectional image of the oral structure; detecting a location of a crown margin corresponding to an edge of a region where a tooth was actually deleted from the partial internal cross-sectional image; merging the location of the crown margin with a surface image of a tooth, and causing a margin of the tooth deletion region obtained from a surface shape image of the tooth to extend to the location of the crown margin.

5 Claims, 6 Drawing Sheets

(56)                 References Cited

U.S. PATENT DOCUMENTS

2011/0196524 A1* 8/2011 Giasson ................. B33Y 50/00
                                                                700/118
2013/0226534 A1* 8/2013 Fisker .................... B33Y 80/00
                                                                703/1
2015/0056576 A1* 2/2015 Nikolskiy ............. A61C 9/004
                                                                433/214
2015/0111172 A1* 4/2015 Jung ........................ A61C 5/77
                                                                433/172
2017/0273763 A1* 9/2017 Fisker .................. A61C 9/0046
2018/0132980 A1* 5/2018 Weisenberg ........... A61B 1/015
2022/0008172 A1* 1/2022 Wedeking ........... A61C 8/0075
2022/0183789 A1* 6/2022 Ciriello ................ A61B 5/0088
2022/0183799 A1   6/2022 Jeong et al.
2022/0265400 A1   8/2022 Jeong et al.
2022/0331072 A1* 10/2022 Song .................... A61C 9/0046
2023/0087800 A1* 3/2023 Bielser ............... A61C 13/0004
                                                                433/24
2023/0162457 A1* 5/2023 Hansen .............. A61C 13/0004
                                                                345/420
2023/0172454 A1   6/2023 Jeong et al.
2023/0310126 A1* 10/2023 Song .................. A61C 13/0004
                                                                345/420
2024/0156567 A1* 5/2024 Coulombe ............... A61C 5/00
2024/0252281 A1* 8/2024 Gerth ..................... A61C 13/34

FOREIGN PATENT DOCUMENTS

KR       10-2022-0119204 A      8/2022
KR       10-2023-0084032 A      6/2023

OTHER PUBLICATIONS

Korean Office action for counterpart Korean Application No. 10-2023-0042127, dated Dec. 27, 2024.

* cited by examiner

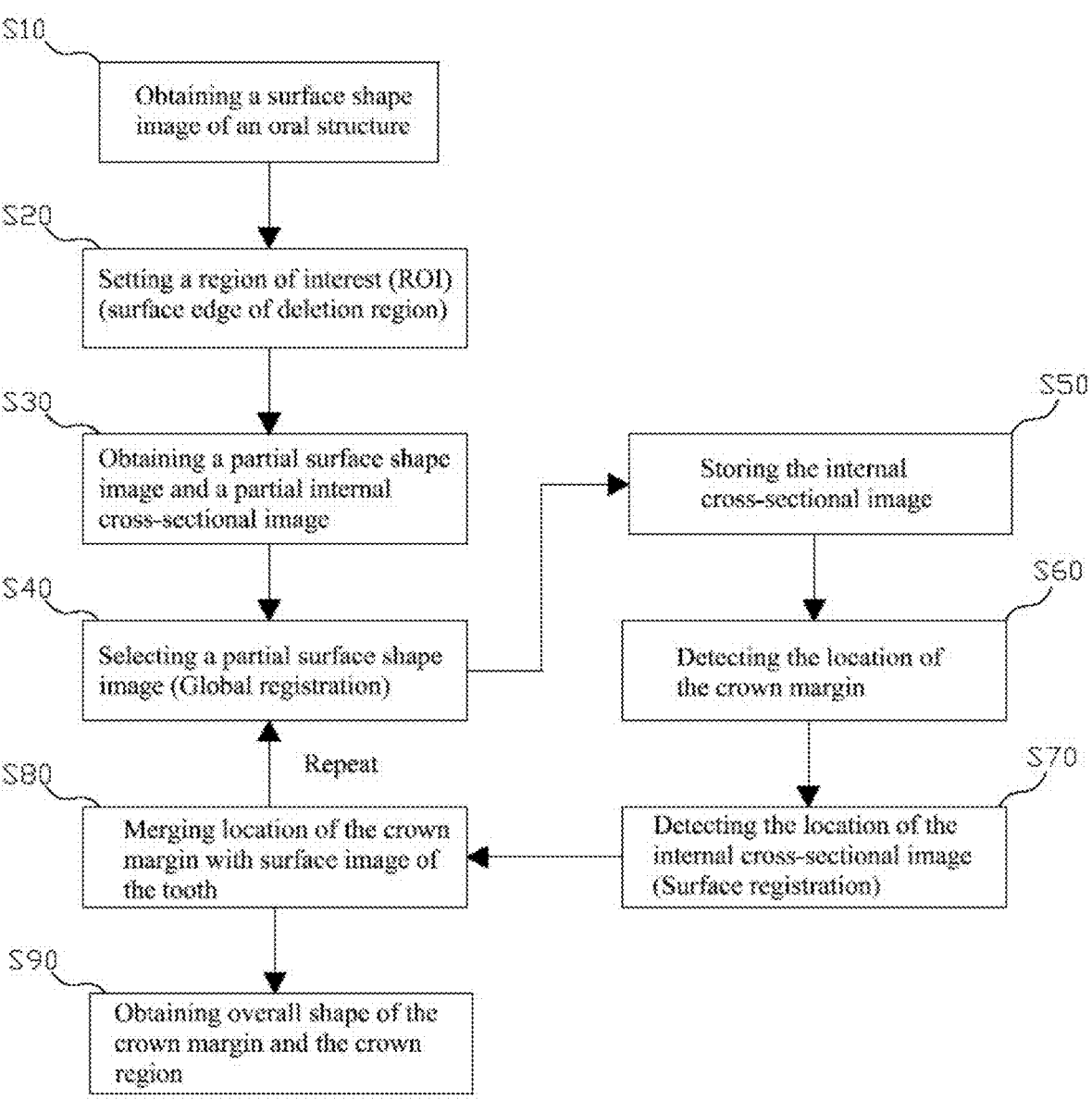

S10
Obtaining a surface shape image of an oral structure

S20
Setting a region of interest (ROI) (surface edge of deletion region)

S30
Obtaining a partial surface shape image and a partial internal cross-sectional image S50
Storing the internal cross-sectional image S40
Selecting a partial surface shape image (Global registration)

S60
Detecting the location of the crown margin

Repeat

S80
Merging location of the crown margin with surface image of the tooth

S70
Detecting the location of the internal cross-sectional image (Surface registration)

S90
Obtaining overall shape of the crown margin and the crown region

METHOD FOR OBTAINING CROWN REGION SHAPE USING INTRAORAL SCANNER HAVING TOMOGRAPHIC IMAGING FUNCTION

CROSS-REFERENCE TO RELATED APPLICATION

This application claims priority from Korean Application No. 10-2023-0042127 filed Mar. 30, 2023, which is incorporated herein by reference in its entirety.

TECHNICAL FIELD

The present disclosure relates to a method for obtaining the shape of a crown region, and more particularly, to a method for obtaining the shape of a crown region for manufacturing a crown prosthesis by using an intraoral scanner having a tomographic imaging function.

RELATED ART

Prosthetic treatment is a dental treatment method that restores the function of a tooth by removing a damaged part of the tooth and fitting a prosthesis to the region where the damaged part was removed. Types of dental prostheses include crowns that cover teeth, bridges that connect artificial teeth, and resins, inlays, onlays, and the like that fill the areas where the damaged parts of teeth have been shaved off. FIG. 1 is a diagram showing the process of a typical crown prosthetic treatment. As shown in FIG. 1, in a typical crown prosthetic treatment, when a damage such as cavity 2 occurs in a tooth 1 (A in FIG. 1), the damaged part is removed along a tooth deletion line 4 to form a tooth deletion region, i.e., a "crown region" (B in FIG. 1), and a crown 6 that is an artificial dental prosthesis manufactured according to the shape of the tooth of the patient is attached to the tooth deletion region formed (C in FIG. 1), thereby restoring the function of the tooth.

In such a crown prosthetic treatment, a three-dimensional (3D) shape of the tooth deletion region (see B in FIG. 1) is obtained using an intraoral scanner, and the crown 6 is produced to fit the shape of the tooth deletion region. Here, in order to produce the crown 6 of an accurate size, it is necessary to obtain an accurate shape of the crown region. However, there are many cases where tooth deletion proceeds subgingivally below the gums (gingivae) 8 in terms of an aesthetic or dental management perspective. In this case, since the crown margin (the edge of the tooth deletion region) 4a located subgingivally, i.e., the boundary line on which the crown 6 is to be placed, is obstructed by the gums 8, it is hard to obtain the shape of the crown region, specifically the shape of the subgingival crown margin 4a with a regular intraoral scanner that can only obtain the surface shape of a target object.

PRIOR ART LITERATURE

Patent Documents (Patent Document 1) Korean Patent Application Publication No. 10-2022-0085364
(Patent Document 2) Korean Patent Application Publication No. 10-2022-0119204
(Patent Document 3) Korean Patent Application No. 10-2022-0155401

SUMMARY

It is an object of the present disclosure to provide a method for obtaining the shape of a crown region by using an intraoral scanner having a tomographic imaging function.

It is another object of the present disclosure to provide a method for obtaining the shape of a crown region that can more accurately detect the shape of the crown region including the shape of a tooth deletion region located subgingivally.

In order to achieve the above objects, the present disclosure provides a method of obtaining a shape of a crown region, comprising the steps of: irradiating a shape measurement light to an oral structure including a tooth on which tooth deletion has been performed and obtaining a three-dimensional surface shape image of the oral structure with reflected light formed by the shape measurement light being reflected off a surface of the oral structure; setting a surface edge of a tooth deletion region as a location of a region of interest 52 in the surface shape image of the oral structure; scanning a surface shape and an internal cross-section of the oral structure at a predetermined location of the oral structure and obtaining a partial surface shape image and a partial internal cross-sectional image of the oral structure; detecting which part of an entire surface shape image of the oral structure the partial surface shape image of the oral structure corresponds to and selecting a partial surface shape image 60 including the region of interest 52; storing a partial internal cross-sectional image measured at a location where the partial surface shape image 60 was obtained; detecting a location of a crown margin 56 corresponding to an edge of a region where a tooth was actually deleted from the partial internal cross-sectional image; merging the location of the crown margin 56 with a surface image of a tooth 50 and causing a margin of the tooth deletion region obtained from a surface shape image of the tooth 50 to extend to the location of the crown margin 56; extending a surface margin of the tooth deletion region around an entire perimeter of the tooth deletion region to the location of the crown margin 56 while changing a location of an intraoral scanner; and connecting the locations of the crown margin 56 obtained around the entire perimeter of the tooth deletion region and obtaining an overall shape of the crown margin 56.

According to the method for obtaining the shape of a crown region in accordance with the present disclosure, the shape of the crown region including the shape of the tooth deletion region located subgingivally can be detected more accurately by using the intraoral scanner having a tomographic imaging function.

BRIEF DESCRIPTION OF THE DRAWINGS

FIG. 3 is a flowchart for describing a method of obtaining the shape of a crown region in accordance with one embodiment of the present disclosure;

DETAILED DESCRIPTION

Hereinafter, the present disclosure will be described in detail with reference to the accompanying drawings.

Figure 1:
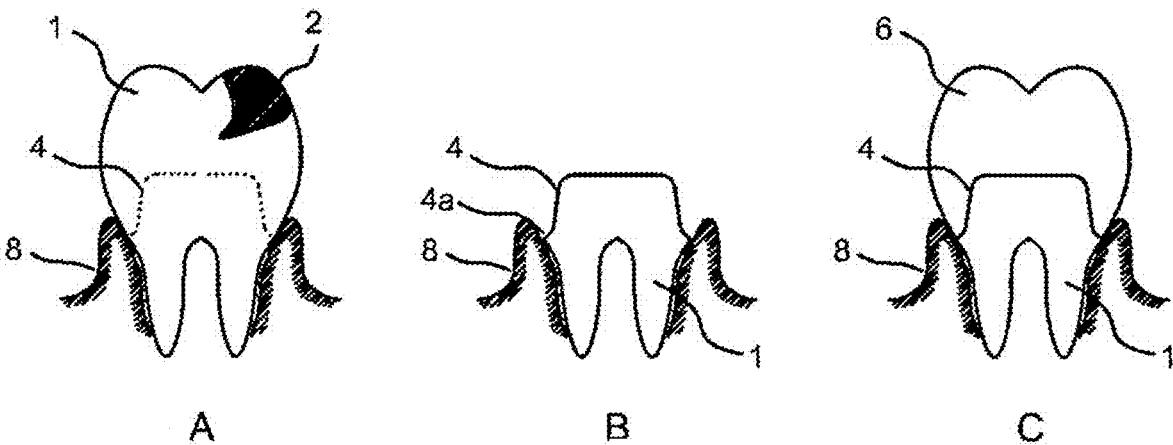
FIG. 1 is a diagram showing the process of a typical crown prosthetic treatment.
Figure 2:
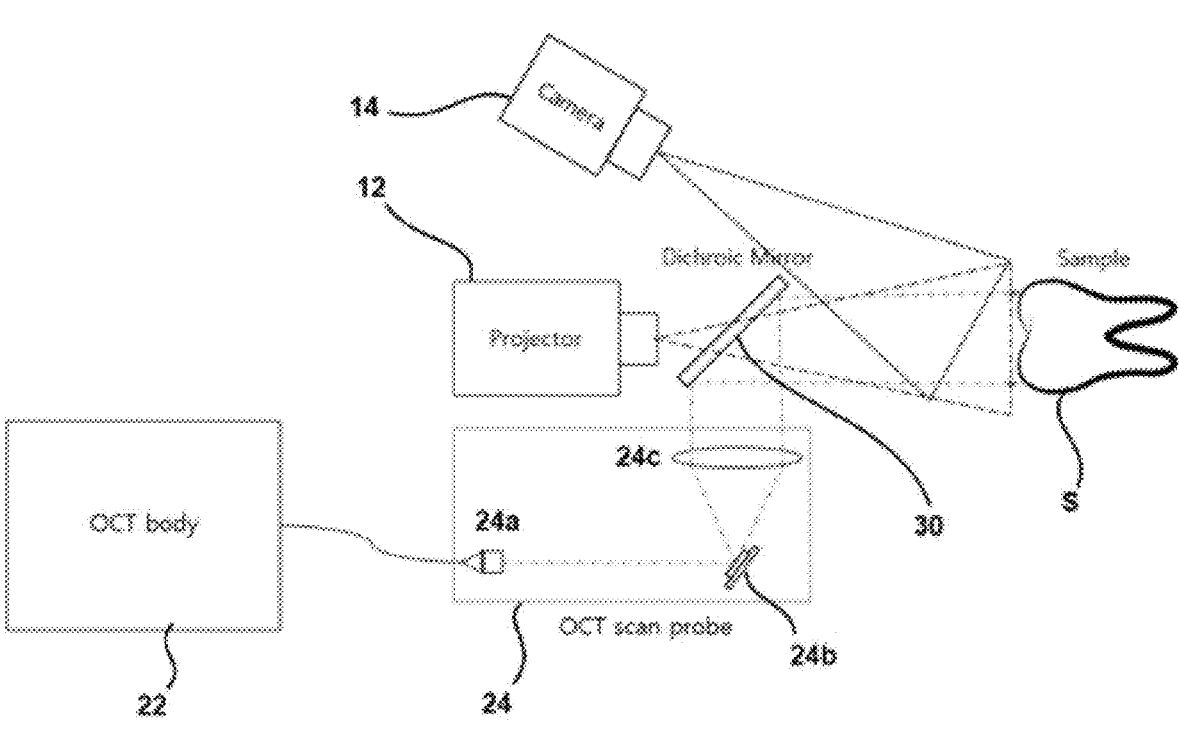
FIG. 2 is a diagram showing the configuration of an intraoral scanner having a tomographic imaging function that can be used in the present disclosure.

FIG. 2 is a diagram showing the configuration of an intraoral scanner having a tomographic imaging function that can be used in the present disclosure. As shown in FIG. 2, the intraoral scanner having a tomographic imaging function in accordance with the present disclosure includes a shape measurement light projector 12, a shape measurement camera 14, an optical coherence tomography (OCT) body 22, an OCT scan probe 24, and a beam splitter 30. The shape measurement light projector 12 irradiates a shape measurement light for obtaining a shape image of an oral structure S such as a tooth. As the shape measurement light, any measurement light that can obtain a shape image of the oral structure S may be used without limitations, and preferably a visible light, for example, a visible light with a wavelength of 400 to 700 nm may be used. The shape measurement camera 14 is a device that obtains a surface shape image of the oral structure S by detecting the reflected light formed by the shape measurement light being reflected off the surface of the oral structure S, and includes a typical image sensor. In operation, a shape measurement light is outputted from the shape measurement light projector 12, the outputted shape measurement light passes through the beam splitter 30 and is then irradiated onto the oral structure S, the reflected light reflected off the oral structure S is detected by the shape measurement camera 14, and a surface shape image of the oral structure S is obtained. At this time, the two-dimensional image of the oral structure S obtained with the shape measurement camera 14 is converted into a three-dimensional image by using triangulation or the like.

The OCT body 22 transmits a layer measurement light (e.g., a near-infrared light) through the oral structure S, and detects reflected light (scattered light) reflected off the interior, specifically, each layer, of the oral structure S, thereby obtaining an internal cross-sectional image of the oral structure S. The OCT body 22 is a device that obtains layer information inside an object by using the coherence properties of the layer measurement light. For example, the layer measurement light may be a broadband low-coherence light having a short coherence distance, and may preferably be a near-infrared light, specifically, a near-infrared light having a wavelength of 750 to 1500 nm. The OCT scan probe 24 is a device that irradiates the layer measurement light emitted from the OCT body 22 to a desired location on the oral structure S, and transfers the reflected light reflected off the oral structure S to the OCT body 22. The OCT scan probe 24 may include a collimator 24*a* that focuses the layer measurement light and its reflected light; a reflection mirror 24*b* that reflects the focused layer measurement light to a desired imaging location of the oral structure S and transfers the reflected light reflected off the oral structure S to the collimator 24*a*; and an objective lens 24*c* that focuses the measurement light reflected off the reflection mirror 24*b* to the desired imaging location of the oral structure S. Here, as the reflection mirror 24*b*, a micro-electro-mechanical system (MEMS) mirror capable of sequentially scanning the imaging locations on the oral structure S by adjusting the reflection angle of the layer measurement light may be used. For example, the reflection mirror 24*b* rotates about two axes (e.g., x-axis and y-axis in an orthogonal relationship) and scans sequentially the plane on which the oral structure S is located, and the layer measurement light is irradiated into the oral structure S in a direction perpendicular to the plane (z-axis direction, orthogonal to the x-axis and y-axis), and thus, a three-dimensional layer image of the oral structure S can be obtained.

The beam splitter 30 is a device that superimposes the optical paths of the shape measurement light emitted from the shape measurement light projector 12 and of the layer measurement light emitted from the OCT scan probe 24, and superimposes a shape acquisition optical system formed by the shape measurement light projector 12 and the shape measurement camera 14 and a layer acquisition optical system formed by the OCT body 22 and the OCT scan probe 24. For example, as shown in FIG. 2, the beam splitter 30 may be a dichroic mirror 30 that irradiates the oral structure S with the shape measurement light and the layer measurement light by transmitting the shape measurement light emitted from the shape measurement light projector 12 and reflecting the layer measurement light emitted from the OCT scan probe 24, and separates and transfers each reflected light to the shape acquisition optical system (specifically the shape measurement camera 14) and the layer acquisition optical system (specifically the OCT body 22). The shape acquisition optical system formed by the shape measurement light projector 12 and the shape measurement camera 14 and the layer acquisition optical system formed by the OCT body 22 and the OCT scan probe 24 use measurement lights of different regions, and thus, cannot use the same optical path. However, as shown in FIG. 3, if the dichroic mirror 30, which reflects the layer measurement light but transmits the shape measurement light, is positioned at a location through which the shape measurement light from the shape measurement light projector 12 passes and which is not included in the FOV (field of view) region of the shape measurement camera 14, an integrated optical system can be formed in which the measurement areas of each of the shape acquisition optical system and the layer acquisition optical system, i.e., ROIs (regions of interest), are superimposed. Therefore, the dichroic mirror 30 makes it possible to obtain both an external surface shape image and an internal layer image of the oral structure S by superimposing the shape measurement light and the layer measurement light and irradiating them to the oral structure S.

Figure 4:
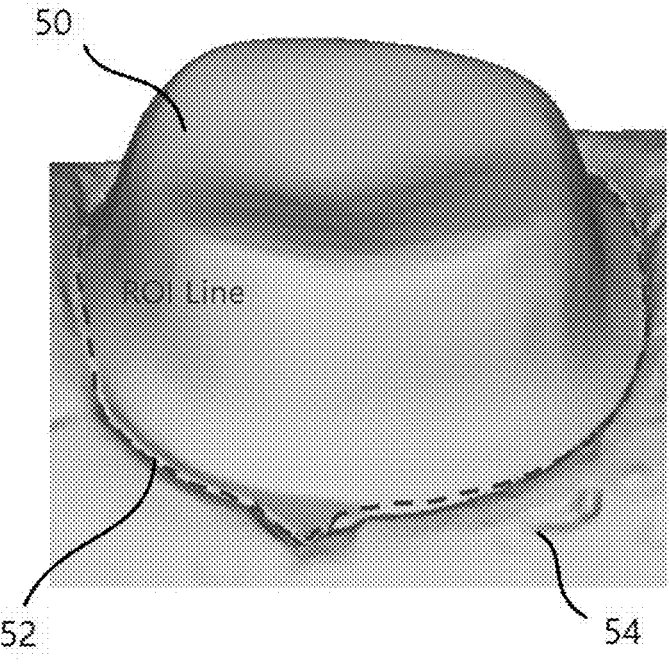
FIG. 4 is a view showing one example of a three-dimensional surface shape image of an oral structure.

FIG. 3 is a flowchart for describing a method of obtaining the shape of a crown region in accordance with one embodiment of the present disclosure. As shown in FIG. 3, in order to obtain the shape of a crown region in which tooth deletion has been performed according to the present disclosure, first, a shape measurement light is irradiated onto the oral structure including a tooth on which the tooth deletion has been performed using the shape measurement light projector 12, the reflected light formed by the shape measurement light being reflected off the surface of the oral structure is detected by the shape measurement camera 14, thereby obtaining a 3D surface shape image of the oral structure (S10). FIG. 4 is a view showing one example of a three-dimensional surface shape image of the oral structure obtained by performing surface scanning in this way, and the surface shape image of the oral structure includes an image of a tooth 50 on which the tooth deletion has been performed and an image of a gum 54 surrounding the tooth 50.

In the surface shape image of the oral structure obtained in this way, the surface margin of the tooth deletion region, i.e., the surface edge of the tooth deletion region, is set as the location of a region of interest (ROI) 52 (ROI set-up) (S20). For example, the boundary line between the tooth 50 and the gum 54 is marked as the region of interest 52 in the three-dimensional surface shape image of the oral structure, as shown in FIG. 4.

Figure 5:
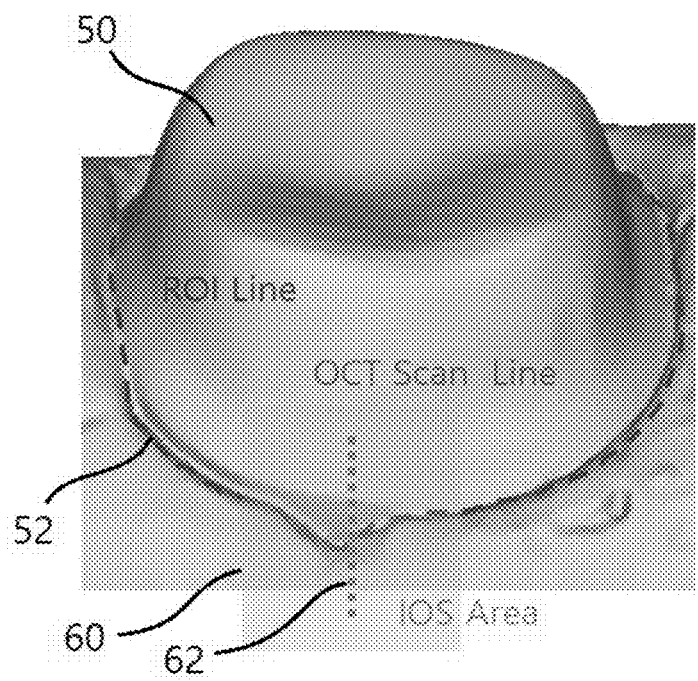
FIG. 5 is a view showing a partial surface shape image, which was obtained at a predetermined location on the oral structure, on an entire surface shape image of the oral structure.

Next, by scanning the surface shape and internal cross-section of the oral structure at a predetermined location on the oral structure, a partial surface shape image (referred to as a "patch") and a partial internal cross-sectional image (referred to as an "OCT image") of the oral structure are obtained (S30). For example, while sequentially moving the location of the intraoral scanner having a tomographic imaging function with respect to the oral structure, a partial surface shape image of the oral structure, i.e., a patch, is obtained using the shape measurement light projector 12 and the shape measurement camera 14, and at the same time, a partial internal cross-sectional image is obtained using the OCT body 22 and the OCT scan probe 24 at the location where the surface shape image was obtained. Specifically, by transmitting a layer measurement light into the oral structure at a predetermined location on the oral structure and detecting the reflected light reflected off each layer inside the corresponding location, i.e., by performing tomography scanning, an internal cross-sectional image of the corresponding location is obtained. FIG. 5 is a view showing a partial surface shape image, which was obtained at a predetermined location on the oral structure, on an entire surface shape image of the oral structure. As shown in FIG. 5, the intraoral scanner obtains a partial surface shape image 60, or a patch, at a predetermined location.

Next, by detecting which part of the entire surface shape image of the oral structure the partial surface shape image 60 of the oral structure obtained in the above step corresponds to (referred to as "global registration"), the partial surface shape image 60 including the region of interest 52 is selected (S40). For example, the partial surface shape image 60 shown in FIG. 5 includes the region of interest 52. The "global registration" is a process of comparing the entire surface shape image of the oral structure with the partial surface shape image 60 of the oral structure and determining which part of the entire surface shape image the partial surface shape image 60 corresponds to.

Figure 6:
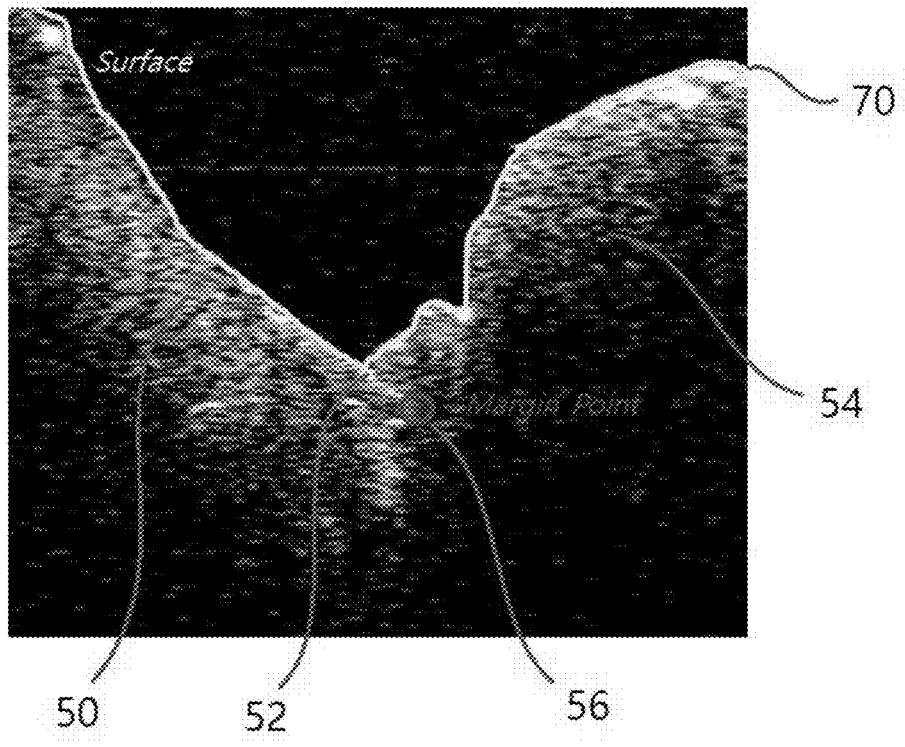
FIG. 6 is a view showing one example of a partial internal cross-sectional image scanned at the location where the partial surface shape image was obtained.

When the partial surface shape image 60 including the region of interest 52 is detected, the partial internal cross-sectional image, i.e., the OCT image, measured at the location where the partial surface shape image 60 was obtained is stored (S50). In FIG. 5, a location 62 where the partial internal cross-sectional image is scanned is indicated by a dotted line at the location where the partial surface shape image 60 was obtained. FIG. 6 is a view showing one example of the partial internal cross-sectional image (i.e., the OCT or tomography image) scanned at the location where the partial surface shape image 60 was obtained. As shown in FIG. 6, the stored partial internal cross-sectional image shows a cross-sectional image of the tooth 50 and the gum 54 and the location of the region of interest 52 between the tooth 50 and the gum 54, and at the same time, shows the edge of the actual tooth deletion region, i.e., the location of the crown margin 56 located subgingivally, which is obstructed by the gum 54.

Next, the location of the crown margin 56 corresponding to the edge of the region where the tooth was actually deleted is detected from the partial internal cross-sectional image (S60). At this time, partial surface shape (surface segment) data of the tooth 50 and the gum 54 may be further detected from the partial internal cross-sectional image as necessary. In the example shown in FIG. 6, the partial surface shape of the tooth 50 and the gum 54 is indicated by a solid line 70 at the locations where the partial internal cross-sectional image was obtained. When the partial surface shape 70 data of the tooth 50 and the gum 54 is obtained from the partial internal cross-sectional image, this is compared with the surface information of the partial surface shape image 60, and thereby, the location where the partial internal cross-sectional image was obtained can be determined more accurately (S70). In this way, the process of comparing the partial surface shape 70 data obtained from the partial internal cross-sectional image with the 3D surface information of the partial surface shape image 60 and accurately setting, i.e., determining the location where the partial surface shape 70, i.e., the internal cross-sectional image, was obtained within the partial surface shape image 60 is called "surface registration." In general, the location 62 at which the partial internal cross-sectional image is scanned is predetermined in the partial surface shape image 60 (e.g., located at the center), but since the location 62 at which the partial internal cross-sectional image is scanned may vary due to the mechanical tolerance of the intraoral scanner, shaking during measurement, etc., it is desirable to more accurately set the location where the partial internal cross-sectional image was obtained by using the partial surface shape 70 data obtained from the partial internal cross-sectional image.

Next, the obtained location of the crown margin 56 is merged with the surface image of the tooth 50, thereby causing the margin of the tooth deletion region obtained from the surface shape image of the tooth 50 to extend to the location of the crown margin 56 (S80). Through this process, the margin of the tooth deletion region is extended from the location of the region of interest 52 (observed in the surface image) to the location of the crown margin 56 obstructed by the gum 54 (see FIG. 6).

Next, when the processes from S40 to S80 are repeated while changing the location of the intraoral scanner, the surface margin of the tooth deletion region can be extended to the location of the crown margin 56 throughout the region of interest 52, specifically, around the entire perimeter of the tooth deletion region. For example, if four or more, preferably ten or more, more preferably 100 or more partial internal cross-sectional images (e.g. FIG. 6) are obtained in the entire perimeter of the region of interest 52, i.e., the tooth deletion region, the locations of the crown margin 56 in the number corresponding thereto can be detected.

By connecting the locations of the crown margin 56 obtained throughout the region of interest 52, specifically, around the entire perimeter of the tooth deletion region in this way, the overall shape of the crown margin 56 and the shape of the crown region (e.g., the part where the tooth is actually deleted) can be obtained (crown margin line reconstruction) (S90).

According to the present disclosure, by merging (ii) the actual location information of the crown margin 56 obtained from the partial internal cross-sectional image with (i) the image of the tooth 50 on which the tooth deletion was performed (the edge is obstructed by the gum 54) obtained from the surface shape image of the oral structure, a complete crown region shape image (not obstructed by the gum 54) of the actual tooth on which the tooth deletion was performed can be obtained.

Although the present disclosure has been described above with reference to the accompanying drawings and example embodiments, the present disclosure is not limited to what is shown in the drawings and the embodiments described above. In the following claims, reference numerals are indicated to aid understanding, but the scope of the following claims should not be limited to what is shown by the reference numerals and in the drawings and should be construed to encompass all modifications, and equivalent constructions and functions of the example embodiments.

What is claimed is:

1. A method of obtaining a shape of a crown region, comprising the steps of:

irradiating a shape measurement light to an oral structure including a tooth on which tooth deletion has been performed, and obtaining a three-dimensional surface shape image of the oral structure by detecting reflected light formed by the shape measurement light being reflected off a surface of the oral structure;

setting a surface edge of a tooth deletion region as a location of a region of interest in the surface shape image of the oral structure;

scanning a surface shape and an internal cross-section of the oral structure at a predetermined location of the oral structure, and obtaining a partial surface shape image and a partial internal cross-sectional image of the oral structure;

detecting which part of an entire surface shape image of the oral structure the partial surface shape image of the oral structure corresponds to, and selecting a partial surface shape image including the region of interest;

storing a partial internal cross-sectional image measured at a location where the partial surface shape image was obtained;

detecting a location of a crown margin corresponding to an edge of a region where a tooth was actually deleted from the partial internal cross-sectional image;

merging the location of the crown margin with a surface image of a tooth, and causing a margin of the tooth deletion region obtained from a surface shape image of the tooth to extend to the location of the crown margin;

extending a surface margin of the tooth deletion region around an entire perimeter of the tooth deletion region to the location of the crown margin while changing a location of an intraoral scanner; and connecting locations of the crown margin obtained around the entire perimeter of the tooth deletion region, and obtaining an overall shape of the crown margin.

2. The method of claim 1, wherein the surface shape image of the oral structure comprises an image of the tooth on which the tooth deletion has been performed and an image of a gum surrounding the tooth, and a boundary line between the tooth and the gum is the region of interest.

3. The method of claim 2, further comprising the step of:

further detecting partial surface shape data of the tooth and the gum from the partial internal cross-sectional image, comparing the partial surface shape data with surface information of the partial surface shape image, and setting a location where the partial internal cross-sectional image was obtained.

4. The method of claim 1, wherein the process of detecting which part of the entire surface shape image of the oral structure the partial surface shape image of the oral structure corresponds to is performed by comparing the entire surface shape image of the oral structure with the partial surface shape image of the oral structure.

5. The method of claim 1, wherein four or more partial internal cross-sectional images are obtained around the entire perimeter of the tooth deletion region.

* * * * *